US011457626B2

(12) United States Patent
Dyer

(10) Patent No.: US 11,457,626 B2
(45) Date of Patent: Oct. 4, 2022

(54) METHOD FOR IMPAIRING A CASSIE-BAXTER STATE

(71) Applicant: Gordon Wayne Dyer, Hobbs, NM (US)

(72) Inventor: Gordon Wayne Dyer, Hobbs, NM (US)

(*) Notice: Subject to any disclaimer, the term of this patent is extended or adjusted under 35 U.S.C. 154(b) by 342 days.

(21) Appl. No.: 15/998,259

(22) PCT Filed: Feb. 4, 2016

(86) PCT No.: PCT/US2016/000014
§ 371 (c)(1),
(2) Date: Jul. 26, 2018

(87) PCT Pub. No.: WO2017/135918
PCT Pub. Date: Aug. 10, 2017

(65) Prior Publication Data
US 2019/0357531 A1    Nov. 28, 2019

(51) Int. Cl.
| | |
|---|---|
| A01N 27/00 | (2006.01) |
| A01N 31/02 | (2006.01) |
| A01N 37/02 | (2006.01) |
| A01N 37/34 | (2006.01) |
| A01N 43/32 | (2006.01) |
| A01N 43/40 | (2006.01) |
| A01N 47/06 | (2006.01) |
| A01N 59/26 | (2006.01) |
| A01N 65/28 | (2009.01) |

(52) U.S. Cl.
CPC ............ *A01N 27/00* (2013.01); *A01N 31/02* (2013.01); *A01N 37/02* (2013.01); *A01N 37/34* (2013.01); *A01N 43/32* (2013.01); *A01N 43/40* (2013.01); *A01N 47/06* (2013.01); *A01N 59/26* (2013.01); *A01N 65/28* (2013.01)

(58) Field of Classification Search
CPC . A01N 27/00; A01N 65/28; A01P 7/00; A01P 7/02; A01P 7/04; Y10S 514/919
See application file for complete search history.

(56) References Cited

U.S. PATENT DOCUMENTS

2009/0214676 A1* 8/2009 Gao .................. A61K 9/70
424/725

FOREIGN PATENT DOCUMENTS

| JP | 4221798 B2 * | 2/2009 | ............ A61K 31/44 |
|---|---|---|---|
| JP | 4221798 B2 * | 2/2009 | |

OTHER PUBLICATIONS

Essential oil of Melaleuca, terpinen-4-ol type (Tea Tree oil) International Standard 3rd edition Feb. 2017, p. 1-6.*
JP-4221798 B2 published Feb. 12, 2009, Machine Translation from InnovationQ on Nov. 7, 2020 Source:IFI.*
Essential oil of Melaleuca, terpinen-4-ol type (Tea Tree oil) International Standard 3rd edition 2017, p. 1-6. (Year: 2017).*

* cited by examiner

*Primary Examiner* — Melissa S Mercier

(57) ABSTRACT

The present invention about using chemicals to interfere with the ability of certain arthropods to shield themselves from their external environment. It teaches to apply chemicals to a specialized portions of the arthropod's body that maintain a gaseous envelope that encoats, protects and extends from the arthropod's skin and, if present, breathing hole. This chemical application causes a failure of this protective envelope, making the arthropod vulnerable its external environment such as to pesticides and can also lead to problems with its ability to breathe.

13 Claims, No Drawings

METHOD FOR IMPAIRING A CASSIE-BAXTER STATE

1. Field of The Invention

The present invention relates to applying chemicals to interfere with the ability of certain arthropods to breathe. More particularly, the present invention relates to applying chemicals to the portions of an arthropod's body that are normally shielded from its external environment by a gaseous envelope that encoats and extends from the arthropod's cuticle and, if present, breathing hole.

2. Description of Related Art

Plastrons are a cuticular bubble of air that protects many arthropods from direct contact with their external environment. This protective shield of air is particularly seen in the arthropods of subclass Acari (ticks, mites), and suborders Heteroptera (bed bugs), and, Anoplura (lice) (Eileen Hebets, Reginald F. Chapman, Surviving the flood: plastron respiration in the nontracheate arthropod. DigitalCommons@University of Nebraska—Lincoln, Journal of Insect Physiology 46:1 (January 2000), pp. 13-19), (Susan M. Villarreal, Truman State University, Plastron respiration in ticks, The 2005 Ecological Society of America Annual Meeting and Exhibition. Dec. 15-18, 2005), (Perez-Goodwyn, P. J. 2007 Anti-wetting surfaces in Heteroptera (Insecta): Hairy solutions to any problem. In Functional Surfaces in Biology. Springer), (Maria Soledad Leonardia, Claudio R. Lazzarib, Uncovering deep mysteries: The underwater life of an amphibious louse. Journal of Insect Physiology Volume 71, December 2014, Pages 164-169). In some arthropod species the plastron functions as a cuticular-derived external gill allowing for gas exchange. In other arthropod species, the plastron organized by the arthropod's cuticle is thought to both help protect the arthropod against desiccation and in breathing. In still other arthropod species, though the arthropod may still partly respire through their cuticle, the plastron is mostly confined to the arthropod's spiracle (trachea-like breathing opening) to protect it from contamination from the arthropod's external environment.

Regardless of the final purpose of the arthropod's plastron, the chemical, physical, and geometrical requirements of the form and composition of the components of the arthropod's cuticle, critical to maintaining this plastron, are very exactingly interrelated to one another (M. R. Flynn, John W. M. Bush, Underwater breathing: the mechanics of plastron respiration. J. Fluid Mech. (2008), vol. 608, pp. 275-296). The generalized organization of this plastron-bearing cuticle formation is a multitude of lipid-bearing (esters, steroids and monocyclic terpenes) 'trees' each surrounded by a protein-rich 'grass', all growing out of and supported by a 'soil' of multiple layers of chitin and hardened with calcium, resulting in an unwettable Cassie-Baxter physical state within the narrowly segmented 'cells' of the plastron (Roy A. Norton, Valerie M. Behan-Pelletier, Calcium carbonate and calcium oxalate as cuticular hardening agents in oribatid mites. Canadian Journal of Zoology, 1991, 69(6): 1504-1511), (calcium phosphate can also be used as a cuticular hardening agent). This unwettable state is due more to the exacting geometrical relationships between the various components that give rise to the plastron rather than because of any inherent unwettability of the component itself (i.e., two separately wettable components, become an unwettable combination when used together in the proper exacting arrangement with one another), (Thierry Darmanin, Frédéric Guittard, Superhydrophobic and superoleophobic properties in nature. Materials Today, Volume 18, Issue 5, June 2015, Pages 273-285). Further, due to the exacting physical strictures required to achieve such a Cassie-Baxter physical state, there are surprisingly few differences between the cuticles of plants and arthropods that share this unwettable property (Song Ha Nguyen, Hayden K. Webb, Peter J. Mahon, Russell J. Crawford and Elena P. Ivanova, Natural Insect and Plant Micro-/Nanostructured Surfaces: An Excellent Selection of Valuable Templates with Superhydrophobic and Self-Cleaning Properties. Molecules 2014, 19(9), 13614-13630).

The arthropod plastron is surprisingly hardy even under high pressures and has both superhydrophobic (particularly against polar solutions) and robust, though limited, oleophobic properties. Researchers are currently trying to biomimic this plastron ability for use in underwater diving, anti-corrosion coatings, anti-icing coatings, liquid-repellent textiles, oil/water separation, nanoparticles assembly, and microfluidic devices. (Julia Nickerl, Mikhail Tsurkan, René Hensel, Christoph Neinhuis, Carsten Werner, The multilayered protective cuticle of Collembola: a chemical analysis. Interface, Journal of the Royal Society: October 2014 Volume: 11 Issue: 99).

Parasitic arthropods having this plastron ability are very difficult to eradicate because their plastron largely shields them from any unamicable chemical exposure, such as pesticides. Ticks, mites, and lice are among those arthropods that have a plastron and cause humanity many problems both directly, as in the case of both rosacea and the inevitable eyelash follicle mite infestation and accompanying dry eye/lid inflammation found in adult humans, and indirectly such as in Lyme's disease, mange, arthropod-borne viral diseases, crop and livestock infestation and (perhaps most importantly) the current die-off of our critically needed pollinating honey bee population (Varroosis), (Parvaiz Anwar Rather, Iffat Hassan, Human Demodex Mite: The Versatile Mite of Dermatological Importance. Indian J Dermatol. 2014 January-February; 59(1): 60-66) (see also, Butovich I A, Lu H, McMahon A, Ketelson H, Senchyna M, Meadows D, Campbell E, Molai M, Linsenbardt E., Biophysical and morphological evaluation of human normal and dry eye meibum using hot stage polarized light microscopy. Invest Ophthalmol Vis Sci. 2014 Jan. 7; 55(1):87-101).

All of the treatments that try to eradicate the current on-going, plastron-bearing mite infestation of our honey bee population are themselves poisonous to bees and thus debilitating to the hive even if the bees manage to survive the treatment (David R. Tarpy, Joshua Summers, Managing Varroa Mites in Honey Bee Colonies. Department of Entomology Apicultural Program, North Carolina State University, April 2006). Oxalic acid, recently approved by EPA for use in controlling varroa mite infestation in honey bees is a very strong acid which means that it cannot be used except when greatly diluted and hence is less effective than it otherwise might be if it could be at higher concentrations. Because of its high acidity, oxalic acid is very dangerous to humans as well as to bees (Toxicity Category I, indicating the highest degree of toxicity) and thus special equipment must be used when handling and administering it.

Demodex mites, the obligate parasites that chronically infest the eyelid follicles and eyelid oil glands of all humans, like bee mites, are also plastron-bearing. Their plastron is one of the features that allows them to feed on their human host, yet still breathe, while remaining submerged within the now older, age-thickened oil of the eyelid's meibomian glands. The meibomian glands are richly surrounded by oxygen-filled arterioles and flanked by eyelashes which the demodex mites can grasp for anchorage. The meibomian glands age-related increasing dysfunction is thought to be the main cause of dry eyes in middle-aged and older patients (Jingbo Liu, Hosam Sheh, Scheffer C. G. Tseng, Pathogenic role of Demodex mites in blepharitis. Curr Opin Allergy Clin Immunol. 2010 October; 10(5): 505-510).

Like the treatments for mite infestations in honey bees, the standard and only known effective treatment for demodex mites is tea tree oil. However, tea tree oil can be used only when diluted because it, like oxalic acid, is toxic to delicate human ocular tissues. Fortunately, a recent study using mineral oil as a control and as a solvent for the various components of tea tree oil has found that terpinen-4-ol is the most active ingredient found in tea tree oil to demodex mites which, though it is still the largest component of tea tree oil (at 65%) should help reduce some of this demodex treatment's toxicity (Sean Tighe, Ying-Ying Gao, Scheffer C. G. Tseng, Terpinen-4-ol is the Most Active Ingredient of Tea Tree Oil to Kill Demodex Mites, Transl Vis Sci Technol. 2013 November; 2(7): 2).

Neither mammals nor honey bees have plastrons. Therefore, an agent or group of agents that would attack a plastron, and thus be toxic to plastron-bearing arthropod either through interfering with their respiration or by promoting their death through desiccation, would not be inherently toxic to mammals or honey bees. Complete death of the mite is not actually necessary for such a plastron-related attack to be a success. Merely driving the infesting mite away from its host or sufficiently decreasing the arthropod's depredations on its host would be still be success (e.g., an demodex eyelid infestation, though asymptomatically present in juveniles, does not generally become severe enough to become symptomatic until later in life).

In view of the foregoing, it would be desirable to harm plastron-bearing arthropods by administering a three-pronged attack on their plastron (a low molecular weight non-polar compound, coupled with a terpene, coupled with a calcium chelating acidic anion), rather than administering each separately and not necessarily in conjunction with one another. It would further be desirable, based on the mechanics and chemical composition of the arthropod plastron, to refine yet, at the same time, expand the available choices of, the low molecular weight non-polar compounds, terpenes, and calcium chelating acidic anions used to synergistically attack plastron-bearing arthropods.

DESCRIPTION OF THE INVENTION

As mentioned above, an arthropod plastron, though robust against larger molecular weight non-polar solutions, is inherently vulnerable against lower molecular weight non-polar solutions: the oleophobic capability of the plastron is not able to keep the lighter molecular weight alkanes (i.e. dodecane or less) from passing through and between the two opposing oleophobic surfaces of the plastron because, despite over 400 million years of evolution, nature is limited by the organic materials available to it. Further, this inherent chemical limitation means that any chemical substance dissolved in, emulsified in, or colloidally suspended within the low molecular weight non-polar solvent will along with this breaching solvent when the plastron's Laplace pressure is broken by this low molecular weight non-polar compound (Thierry Darmanin, Frédéric Guittard, Superhydrophobic and superoleophobic properties in nature. Materials Today, Volume 18, Issue 5, June 2015, Pages 273-285).

Though the low molecular weight non-polar chemical itself would be detrimental to the exacting chemical/geometrical nature of the arthropod's plastron (by changing the shape of the air-filled plastron to a new, more densely filled, liquid plastron shape, by altering the field strengths of the plastron's hydrophobic and hydrophilic components in this now alkane-filled, oleophilic environment, and by clogging their respiration), a more deleterious and longer lasting effect would be achieved if a chemical substance dissolved in, emulsified in, or colloidally suspended within the low molecular weight non-polar compound would inherently interfere with the exacting chemical (e.g., lipids and calcium salts) and geometrical nature of the components necessary for the plastron to function.

As mentioned above, the arthropod plastron is composed of hydrophobic, monocyclic terpenes. Therefore, one such way to degrade the arthropod plastron's shielding ability is to place, carried along by the breaching inflow of the low molecular weight non-polar solvent into which they are suspended/dissolved/emulsified, extra and potentially endogenously-different terpenes within the plastron to chemically compete with plastron's exactingly purpose-limited number and physical arrangement of endogenous terpenes. These interfering terpenes should be in the form of, but not limited to, monocyclic terpenes, monocyclic terpinenes, monocyclic phellandrenes, monocyclic terpinolenes, and monocyclic terpenoids (with the claim exception of monocyclic terpenoid, terpinen-4-ol, already claimed above by Gao, United States Patent Application No. 20090214676) both because they are all small, low molecular weight compounds that are highly soluble in alkanes, and because, being monocyclically similar to the arthropod's terpenes, they inherently chemically compete with the endogenous terpenes of the arthropod plastron. Because these exogenous terpenes chemically compete with the plastron's endogenous terpenes, they inherently interfere with plastron's exactingly purpose-limited number and physical arrangement of these endogenous terpenes and thus degrades the arthropod plastron's ability to function properly.

Unfortunately, as explained above, oxalic acid, is highly acidic and thus inherently toxic (except sparingly) to all living things. However, anionic compounds dipicolinic acid (like oxalic acid, a bicarboxylic bidentate calcium chelator) and phosphoric acid are both about 10 times less acidic than oxalic acid. Further, their respective salts, sodium dipicolinate and monosodium phosphate both have essentially neutral pHs and both are known, powerful natural coordination complex chelators that prefer calcium over sodium in all but basic pH environments. A salt is, of course, an ionic compound that results from the neutralization reaction of an acidic anion and a base (in the arthropod plastron case, this base is calcium). This calcium coordination effect is why acidic anions dipicolinic acid and phosphoric acid, as well as their respective salts, are commonly used detergent ingredients (European Patent No. EP 0358472 A2, Detergent Compositions). In addition, phosphates (the phosphoric acid salts) are so safe and non-toxic that they are used as food additives and as emulsifiers. These acidic anionic chelators (such as carboxylic, dipicolinic, phosphoric, and oxalic acids, as well as their respective salts) are inherent plastron degraders because, as mentioned previously, the arthropod plastron is composed of plastron-hardening calcium salts, namely calcium carbonate, calcium phosphate, and calcium oxalate. Because of the presence of these endogenous calcium salts, it follows that another way to degrade the arthropod plastron's shielding ability is to interfere with the calcium salt hardening arrangement of these endogenous calcium salts by placing, carried along by inflow of the low molecular weight non-polar solvent into which they are suspended/emulsified/miscible, extra and potentially endogenously-different acidic anions to inherently compete for possession of the calcium portion of these salts. This competition for the endogenous plastron calcium inherently interferes with plastron's exactingly purpose-limited number and physical arrangement of these endogenous calcium salts and thus degrades the arthropod plastron's ability to function properly.

As natural emulsifiers, the use of phosphates also greatly expands the possible range of usable solution/suspensions available for the present invention to concomitantly include, along with these phosphates, other arthropod plastron chemical degraders, such as carboxylic, dipicolinic, oxalic acids and their respective salts, as well as terpenes and low molecular weight non-polar alkanes, including cyclic alkanes. Dipicolinic acid is also dually beneficially to this plastron degrading effect because it is also a potent anti-inflammatory PLA2 inhibitor and thus would help reduce the concomitant skin inflammation associated with demodex infestations (U.S. Pat. No. 6,127,393, Antiproliferative, anti-infective, antiinflammatory, autologous immunization agent and method). Further, until now the use of dipicolinic acid in a topically applied solution/suspension has been limited because of its limited solubility in water. However, the inventor has discovered that dipicolinic acid is soluble in glycerin, a common skin product ingredient, and is colloidal in low molecular weight non-polar solutions and in hyaluronic acid (a very high molecular weight protein common to the eye).

Enablement of the present invention is already well established. Mineral oil has been widely used by bee keepers to help control bee arthropod mites (Pedro P. Rodriguez, D. V. M., Mineral oil as an alternative treatment for honey bee mites, Methods of application and test results. May 1999); they simply did not know until now that only the lightest grade component of the mineral oil they were using that was actually effective (the average molecular weight of the mineral oil used was 350, but only molecular weights of approximately 175 (i.e., dodecane) or less will actually penetrate an arthropod plastron). Tea tree oil, as discussed above is rich in terpenes. Tea tree oil has been known for many years as a powerful anti-bacterial/anti-fungal and in recent years, based on what was assumed to be its general anti-septic properties, it has been used as the only known treatment for arthropod (mite) infestations of human eyelids. It simply was not known until now that the actual terpene to be used in the treatment should be based on (although not necessarily identical to) the terpenes present in the particular species of arthropod plastron in question. They also did not know until now that the low molecular weight solvent the terpene was dissolved in was actually part of the treatment needed to convey the terpene into the arthropod plastron so that it can actually work, rather than just to dilute the terpene so that it was not so toxic to the eyelid itself (i.e., the terpene, itself a low molecular weight cyclical alkane-related compound, would not be very effective dissolved in heavy-grade mineral oil for the treatment of demodex).

As discussed above, acidic anions such as oxalic acid have been known for some years to be somewhat effective in controlling bee arthropod mites based on what was assumed to be its high acidity. It simply was not known until now that the actual acidic anion to be used in the treatment should be based on the calcium salts actually present in the particular species of arthropod plastron in question. It was also not known until now that other acidic anions and their respective salts would, in contrast to the prevailing high-acidity-needed treatment assumption, be potentially even more effective than oxalic acid in poisoning arthropod plastrons because, being less acidic than oxalic acid, they can be used at higher concentration than oxalic acid. It was also not known until now that other acidic anions and their respective salts would be potentially even more effective than oxalic acid in poisoning arthropod plastrons because some of them can form coordination complexes with the calcium present in the arthropod plastron. Finally, enablement of the present invention is established because, though somewhat known separately, it was not known until now that these three treatment elements would work best (and therefore as a particularly preferred embodiment) if used in conjunction with one another because they would then all attack the plastron-bearing arthropod simultaneously.

The foregoing description is intended to be illustrative and is not to be taken as limiting. Other variations within the spirit and scope of this invention are possible and will be apparent to those skilled in the art.

Mineral oil means any of various lighter mixtures of higher alkanes (nonane to tetrapentacontane) from a mineral source, particularly a distillate of petroleum that is available in light and heavy grades and three basic classes: alkanes, based on n-alkanes; naphthenic oils, based on cycloalkanes; and, aromatic oils, based on aromatic hydrocarbons.

Emulsifier means a compound or substance at acts as a stabilizer for emulsions preventing the liquids from separating.

Emulsion means a mixture of two or more liquids that are normally immiscible such that the first liquid (the dispersed phase) is dispersed in the other, second liquid (the continuous phase) and includes reverse emulsions.

Cassie-Baxter state means the unwettable surface condition that results when, due to the hierarchical structure roughness (micro roughness covered with nano roughness) and angles of the solid surface, it is energetically more profitable (in a surface tension sense) for the liquid's molecules to adhere to one another than it is to fill in the valleys of the rough surface and thus actually touch the solid surface.

Surface tension means the elastic tendency of a fluid surface, caused by the polar cohesion of the molecules within the fluid and positively correlated with the polarity of the fluid's molecules (i.e., non-polar molecules result in fluids with the least surface tension), that makes a fluid acquire the least surface area possible.

Mixture means the physical combination of two or more different substances which are mixed but are not combined chemically and includes being in the form of form of solutions, emulsions, suspensions, and colloids.

Oleo means organic chemicals that are derived from plant and animal fats.

Laplace pressure means the pressure difference between the inside and the outside of a curved surface such as the pressure difference caused by the surface tension of the interface between a liquid and a gas.

Terpene means any of a class of hydrocarbons occurring widely in plants and animals built up from isoprene, a hydrocarbon consisting of five carbon atoms attached to eight hydrogen atoms (C5H8), including oxygenated and fatty acid derivatives of these hydrocarbons.

Hydro means water or an aqueous solution tending to dissolve in, mix with, or have a strong affinity for water.

Chelation means a type of bonding of ions or Lewis base molecules to metal ions involving the formation of two or

SUMMARY OF THE INVENTION

In one embodiment, the present invention includes a method of breaching an oleo and hydro resistant arthropod plastron in order to harm the arthropod by applying a low molecular weight non-polar chemical breacher compound to overcome the oleo resistance of an arthropod plastron.

In another embodiment, the present invention includes a method of breaching an oleo and hydro resistant arthropod plastron in order to harm the arthropod by applying a low molecular weight non-polar chemical breacher to overcome the oleo resistance of an arthropod plastron where the low molecular weight non-polar breacher is part of a mixture and comprises between 0.01 to 99.99% of the composition mixture.

In another embodiment, the present invention includes a method of breaching an oleo and hydro resistant arthropod plastron in order to harm the arthropod by applying a low molecular weight non-polar chemical breacher to overcome the oleo resistance of an arthropod plastron where the low molecular weight non-polar breacher is part of a mixture and comprises between 0.01 to 99.99% of the mixture and where the low molecular weight non-polar breacher has a molar mass of between 1 g/mol to 200 g/mol.

In another embodiment, the present invention includes a method of breaching an oleo and hydro resistant arthropod plastron in order to harm the arthropod by applying a low molecular weight non-polar chemical breacher to overcome the oleo resistance of an arthropod plastron where the low molecular weight non-polar breacher is selected from the group consisting of: a branched alkane, a cyclical alkane, a linear alkane, and a polyunsaturated hydrocarbon.

In another embodiment, the present invention includes a method of breaching an oleo and hydro resistant arthropod plastron in order to harm the arthropod by applying a low molecular weight non-polar chemical breacher to overcome the oleo resistance of an arthropod plastron where the low molecular weight non-polar breacher is selected from the group consisting of: cyclopentane, cyclohexane, benzene, toluene, 1,4-dioxane, 1,4-dioxacyclohexane, xylene, acetonitrile, dimethylsulfoxide, pentane, isopentane, and neopentane, dodecane and all its isomers, cyclododecane, undecane and all its isomers, cycloundecane decane, cyclodecane, nonane and all its isomers, cyclononane, octane and all its isomers, cyclooctane, heptane and all its isomers, cycloheptane, hexane and all its isomers, butane, and isobutene.

In another embodiment, the present invention includes a method of breaching an oleo and hydro resistant arthropod plastron in order to harm the arthropod by applying a low molecular weight non-polar chemical breacher to overcome the oleo resistance of an arthropod plastron where the low molecular weight non-polar breacher is mixed with a calcium chelator.

In another embodiment, the present invention includes a method of breaching an oleo and hydro resistant arthropod plastron in order to harm the arthropod by applying a low molecular weight non-polar chemical breacher to overcome the oleo resistance of an arthropod plastron where the low molecular weight non-polar breacher is mixed with a calcium chelator that is selected from the group consisting of: oxalic acid and all its salts; dipicolinic acid and all its salts; phosphoric acid and all its salts; incorporated by reference, all of the agents disclosed in claim 2 of U.S. Pat. No. 6,127,393; carbonic acid and all its salts; sodium hexametaphosphate; phosphate esters; and, incorporated by reference, all of the phosphate and phosphoric acid compositions disclosed by U.S. Pat. No. 3,122,508.

In another embodiment, the present invention includes a method of breaching an oleo and hydro resistant arthropod plastron in order to harm the arthropod by applying a low molecular weight non-polar chemical breacher compound to overcome the oleo resistance of an arthropod plastron where the low molecular weight non-polar breacher is part of a mixture and comprises between 0.01 to 99.99% of the mixture and the low molecular weight non-polar breacher is mixed with tea tree oil.

In another embodiment, the present invention includes a method of breaching an oleo and hydro resistant arthropod plastron in order to harm the arthropod by applying a low molecular weight non-polar chemical breacher to overcome the oleo resistance of an arthropod plastron where the low molecular weight non-polar breacher is part of a mixture and comprises between 0.01 to 99.99% of the mixture and the low molecular weight non-polar breacher is mixed with a terpene, not including terpinen-4-ol.

In another embodiment, the present invention includes a method of breaching an oleo and hydro resistant arthropod plastron in order to harm the arthropod by applying a low molecular weight non-polar chemical breacher to overcome the oleo resistance of an arthropod plastron where the low molecular weight non-polar breacher is part of a mixture and comprises between 0.01 to 99.99% of the mixture and the low molecular weight non-polar breacher is mixed with a therapeutically effective amount of at least one terpene chosen from selected from the group consisting of: monocyclic terpenes and their fatty acid derivatives; terpin hydrates and their fatty acid derivatives; terpineols and their fatty acid derivatives; terpinenes and their fatty acid derivatives, phellandrenes and their fatty acid derivatives; terpinolenes and their fatty acid derivatives; limonenes and their fatty acid derivatives; terpentines and their fatty acid derivatives; p-cymene and its fatty acid derivatives; carveols and their fatty acid derivatives; carvones and their fatty acid derivatives; sylvestrenes and their fatty acid derivatives; menthanes and their fatty acid derivatives; menthols and their fatty acid derivatives; tetraterpenes and their fatty acid derivatives, tetraterpenoids and their fatty acid derivatives, lycopenes and their fatty acid derivatives, lycopanes and their fatty acid derivatives; lycopadienes and their fatty acid derivatives; carotenes and their fatty acid derivatives; diterpenes and their fatty acid derivatives; diterpenoids and their fatty acid derivatives; and, monocyclic terpenoids and their fatty acid derivatives.

In another embodiment, the present invention includes a method of breaching an oleo and hydro resistant arthropod plastron in order to harm the arthropod by applying a low molecular weight non-polar chemical breacher to overcome the oleo resistance of an arthropod plastron where the low molecular weight non-polar breacher is mixed with a therapeutically effective amount of a calcium chelator and a terpene, not including terpinen-4-ol.

In another preferred embodiment, the present invention includes a method of breaching an oleo and hydro resistant arthropod plastron in order to harm the arthropod by applying a low molecular weight non-polar chemical breacher to overcome the oleo resistance of an arthropod plastron where the low molecular weight non-polar breacher is mixed with a therapeutically effective amount of a calcium chelator and at least one terpene chosen from the group consisting of: monocyclic terpenes and their fatty acid derivatives; terpin hydrates and their fatty acid derivatives; terpineols and their fatty acid derivatives; terpinenes and their fatty acid derivatives, phellandrenes and their fatty acid derivatives; terpinolenes and their fatty acid derivatives; limonenes and their fatty acid derivatives; terpentines and their fatty acid derivatives; p-cymene and its fatty acid derivatives; carveols and their fatty acid derivatives; carvones and their fatty acid derivatives; sylvestrenes and their fatty acid derivatives; menthanes and their fatty acid derivatives; menthols and their fatty acid derivatives; tetraterpenes and their fatty acid derivatives, tetraterpenoids and their fatty acid derivatives, lycopenes and their fatty acid derivatives, lycopanes and their fatty acid derivatives; lycopadienes and their fatty acid derivatives; carotenes and their fatty acid derivatives; diterpenes and their fatty acid derivatives; diterpenoids and their fatty acid derivatives; and, monocyclic terpenoids and their fatty acid derivatives.

In another preferred embodiment, the present invention includes a method of breaching an oleo and hydro resistant arthropod plastron in order to harm the arthropod by applying a low molecular weight non-polar chemical breacher to overcome the oleo resistance of an arthropod plastron where the low molecular weight non-polar breacher compound is mixed a therapeutically effective amount of a terpene, not including terpinen-4-ol, and at least one calcium chelator selected from the group consisting of: oxalic acid and all its salts; dipicolinic acid and all its salts; phosphoric acid and all its salts; all of the agents disclosed in claim 2 of U.S. Pat. No. 6,127,393; carbonic acid and all its salts; sodium hexametaphosphate; phosphate esters; and, all of the phosphate and phosphoric acid compositions referenced by U.S. Pat. No. 3,122,508.

In another embodiment, the present invention includes a method of breaching an oleo and hydro resistant arthropod plastron in order to harm the arthropod by applying a low molecular weight non-polar chemical breacher to overcome the oleo resistance of an arthropod plastron where the arthropod is selected from the group consisting of: Acari; Heteroptera; and, Anoplura.

I claim:

1. A method of breaching a Cassie-Baxter state, air-filled arthropod plastron having endogenous terpenes, hydrophobic/hydrophilic field strengths, an environment, a Laplace pressure and air and solid surfaces and a size in order to harm an arthropod, the method comprising: applying a low molecular weight non-polar chemical breacher, not including xylene and tea tree oil and its ingredients, having a sufficiently low surface tension and sufficiently small molecular size such that it is incapable of forming a Cassie-Baxter state with the arthropod plastron in order to overcome/breach the Laplace pressure of the arthropod plastron and thus impair the unwettable Cassie-Baxter state of the arthropod plastron.

2. The method of claim 1, wherein the breacher is part of a mixture.

3. The method of claim 1, wherein the breacher has a molar mass of between 1 g/mol to 200 g/mol.

4. The method of claim 1, wherein the breacher, not including xylene and tea tree oil and its ingredients, is selected from the group consisting of: a branched alkane, a cyclical alkane, a linear alkane, and a polyunsaturated hydrocarbon.

5. The method of claim 1, wherein the breacher is selected from the group consisting of: cyclopentane; cyclohexane; benzene; 1,4-dioxacyclohexane; pentane; isopentane; and neopentane; dodecane and its isomers; cyclododecane; undecane and its isomers; cycloundecane; decane and its isomers; cyclodecane; nonane and its isomers; cyclononane; octane and its isomers; cyclooctane; heptane and its isomers; cycloheptane; hexane and its isomers; butane; and isobutene.

6. The method of claim 2, wherein the breacher is mixed with an amount of calcium chelator, not including calcium carbonate, non-metallic(organo) phosphates and phosphate esters, wherein the resultant mixture remains sufficiently nonpolar so as to be incapable of forming a Cassie-Baxter state with the arthropod plastron.

7. The method of claim 6, wherein the calcium chelator is selected from the group consisting of: oxalic acid and all its salts; dipicolinic acid and all its salts; picolinic acid or a pharmaceutically acceptable salt thereof wherein chemical substituents subtending from its 3-6 chemical numeric positions are selected from the group consisting of a carboxyl group, methyl group, ethyl group, propyl group, isopropyl group, butyl group, isobutyl group, secondary butyl group, tertiary butyl group, pentyl group, isopentyl group, neopentyl group; fluorine, chlorine, bromine, iodine and hydrogen; sodium hexametaphosphate; and alkali metal polyphosphates, including having the polyphosphate be selected from the group consisting of sodium tripolyphosphate, tetrasodium pyrophosphate, and tetrapotassium pyrophosphate.

8. The method of claim 2, wherein the breacher is mixed with a terpene, which can include tea tree oil and its ingredients.

9. The method of claim 8, wherein the terpene is selected from the group consisting of: monocyclic terpenes and the fatty acid derivatives of menthane and cymene; terpin hydrates and their fatty acid derivatives; terpineols and their fatty acid derivatives; terpinenes and their fatty acid derivatives; phellandrenes and their fatty acid derivatives; terpinolenes and their fatty acid derivatives; limonenes and their fatty acid derivatives; terpentines and their fatty acid derivatives; p-cymene and its fatty acid derivatives; carveols and their fatty acid derivatives; carvones and their fatty acid derivatives; sylvestrenes and their fatty acid derivatives; menthanes and their fatty acid derivatives; menthols and their fatty acid derivatives; tetraterpenes and their fatty acid derivatives; tetraterpenoids and their fatty acid derivatives; lycopenes and their fatty acid derivatives, lycopanes and their fatty acid derivatives; lycopadienes and their fatty acid derivatives; carotenes and their fatty acid derivatives; diterpenes and their fatty acid derivatives; diterpenoids and their fatty acid derivatives; and, monocyclic terpenoids and their fatty acid derivatives.

10. The method of claim 6 wherein the calcium chelator is mixed with a terpene, which can include tea tree oil and its ingredients.

11. The method of claim 10, wherein the terpene that the calcium chelator is mixed with is selected from the group consisting of: monocyclic terpenes and their fatty acid derivatives; terpin hydrates and their fatty acid derivatives; terpineols and their fatty acid derivatives; terpinenes and their fatty acid derivatives; phellandrenes and their fatty acid derivatives; terpinolenes and their fatty acid derivatives; limonenes and their fatty acid derivatives; terpentines and their fatty acid derivatives; p-cymene and its fatty acid derivatives; carveols and their fatty acid derivatives; carvones and their fatty acid derivatives; sylvestrenes and their fatty acid derivatives; menthanes and their fatty acid derivatives; menthols and their fatty acid derivatives; tetraterpenes and their fatty acid derivatives; tetraterpenoids and their fatty acid derivatives; lycopenes and their fatty acid derivatives, lycopanes and their fatty acid derivatives; lycopadienes and their fatty acid derivatives; carotenes and their fatty acid derivatives; diterpenes and their fatty acid derivatives; diterpenoids and their fatty acid derivatives; and, monocyclic terpenoids and their fatty acid derivatives.

12. The method of claim 10, wherein the calcium chelator, that is mixed with the terpene is selected from the group consisting of: oxalic acid and all its salts; dipicolinic acid and all its salts; picolinic acid or a pharmaceutically acceptable salt thereof wherein chemical substituents subtending from its 3-6 chemical numeric positions are selected from the group consisting of a carboxyl group, methyl group, ethyl group, propyl group, isopropyl group, butyl group, isobutyl group, secondary butyl group, tertiary butyl group, pentyl group, isopentyl group, neopentyl group; fluorine, chlorine, bromine, iodine and hydrogen; sodium hexametaphosphate; and alkali metal polyphosphates, including having the polyphosphate be selected from the group consisting of sodium tripolyphosphate, tetrasodium pyrophosphate, and tetrapotassium pyrophosphate.

13. The method of claim 1, wherein the arthropod is selected from the group consisting of: Acari; Heteroptera; and, Anoplura.

\* \* \* \* \*